Nov. 8, 1927.  
B. L. DICKINSON  
1,647,986
CAMERA AND TRIPOD FASTENER
Original Filed Aug. 12, 1924
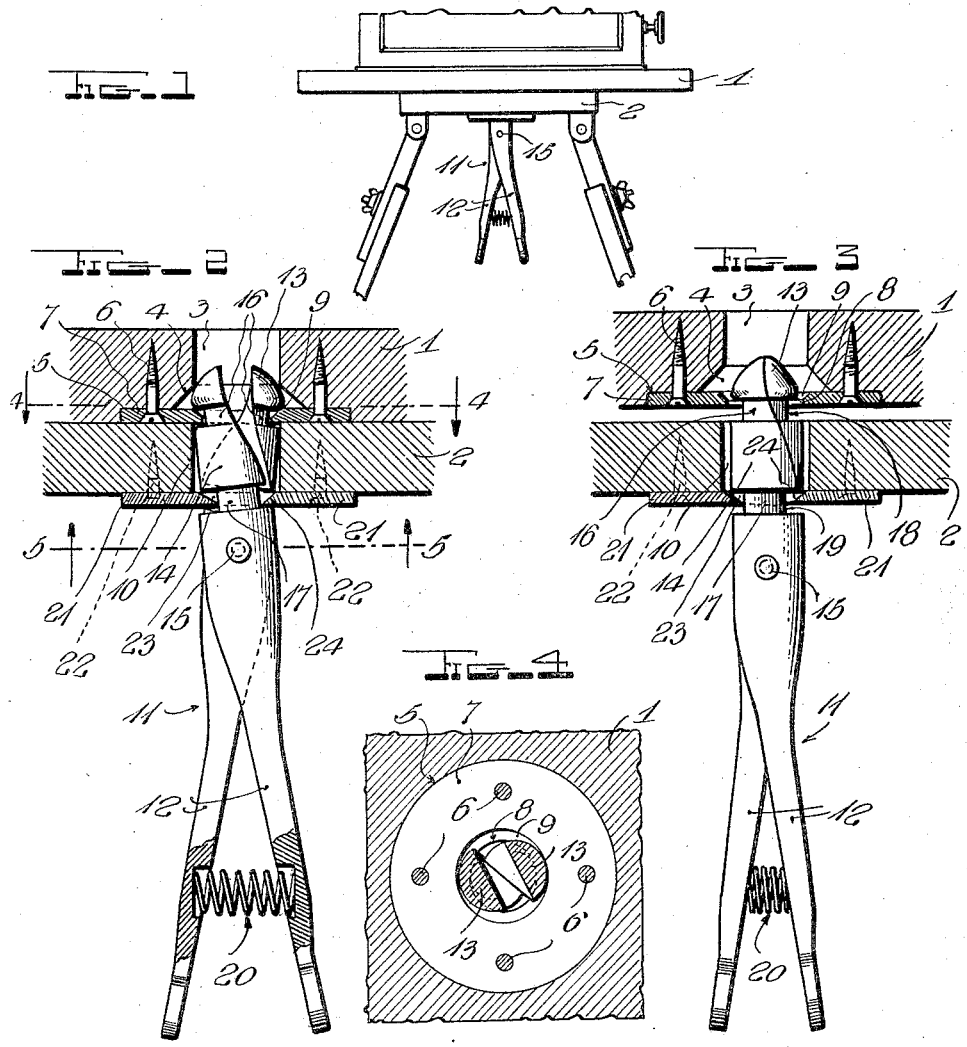
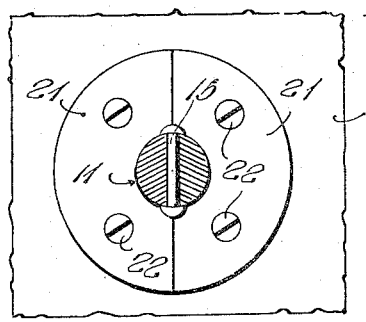
Inventor  
B. L. Dickinson  
By C. C. Hines,  
Attorney Patented Nov. 8, 1927.

1,647,986

UNITED STATES PATENT OFFICE.

BERNARD L. DICKINSON, OF EL CAMPO, TEXAS.

CAMERA AND TRIPOD FASTENER.

Application filed August 12, 1924, Serial No. 731,618. Renewed April 12, 1927.

This invention relates to fasteners or locks for detachably fastening a camera to a tripod or like support, and which is adapted for use generally for the purpose of effecting an easy and quick coupling or uncoupling connection between the parts to be attached, permitting pivotal movement of one part on the other for ready adjustment to different working positions, and holding the parts firmly connected when fastened or locked together.

The object of the invention is to provide a device of the character described particularly designed for fastening a camera to its tripod support, but which is also adapted for other similar uses.

The invention consists of the features of construction, combination and arrangement of parts, hereinafter fully described and claimed, reference being had to the accompanying drawing, in which:—

Figure 1 is a fragmentary side elevation of a camera and tripod coupled by means of my improved fastener.

Figure 2 is a vertical section thereof showing the members locked together.

Figure 3 is a view similar to Figure 2 showing the parts in released position.

Figure 4 is a horizontal section on the line 4—4 of Figure 2.

Figure 5 is a horizontal section on the line 5—5 of Figure 2.

Referring now more particularly to the drawings, 1 and 2 respectively designate two parts to be detachably fastened. The part 1, for instance, may be the base of a photographic camera and the part 2 the head of a tripod or like support.

In accordance with my invention, the part 1 is provided with a locking opening 3 which may extend therethrough, one side (the bottom) of which opening is enlarged or flared as at 4, to provide a beveled or wedge-shaped friction surface. Also formed in the bottom of the member 1 is a countersink or recess 5 in which is set and secured, as by means of screws or similar fastenings 6, a keeper or lock plate 7. This lock plate 7 is provided with an opening 8, the inner wall of which is beveled, as indicated at 9.

The member 1 is designed to rest upon the member 2, and this member 2 is provided with an opening 10 to aline with the opening 3 in the member 1. This opening 10 is adapted for the passage of the locking end of a fastener or lock member 11. This lock member 11 comprises a split bolt formed of a pair of sections, each having one end formed to provide a lever arm or finger piece 12 and having its opposite end formed to provide a jaw having a shoulder section 13 and a head section 14. Between their ends the members of the lock bolt are pivotally connected by a pin or rivet 15, whereby the parts thereof are held assembled, and whereby pivotal movements of the bolt members are permitted, through the medium of the finger pieces or lever arms 12, for the purpose of expanding and contracting the jaw sections 14.

The sections 13 cooperate to provide a circular shoulder of a diameter to snugly fit within the opening 8 of the base 2, said shoulder being separated from the head 14 by an annular groove 16 and from the pivoted body portions of the jaws by a groove 17, said grooves reducing the intervening portions to provide necks 18 and 19.

The head 14 formed by the head sections of the jaws is of a diameter adapting it when contracted to be passed through the opening 9 of the lock plate 7 and seated in the enlarged portion 4 of the opening 3, and this head is adapted to be expanded to a diameter greater than the opening 9 so as to bear against the upper side of the plate and in contact with the walls of the enlargement 4, whereby the lock bolt will be held from withdrawal through the opening 9 and will frictionally engage the walls of the enlargement 4 to lock the two members 1 and 2 firmly and securely together. A coiled expansion spring 20 is seated at its ends in recesses in the handles or finger pieces 12 and serves by its expansive energy to force the lever arms 12 and the head sections 14 of the jaws outwardly or to spread them, thereby normally maintaining the parts of the bolt in locking position. A retainer plate composed of semicircular sections 21 is provided upon the underside of the member 2 to engage and hold the lock bolt fitted thereto. The sections of this retainer plate are adapted to be secured in position by screws or like fastenings 22, and the sections of the retainer plate are semi-circularly recessed, as at 23, to cooperatively form a circular passage for the neck 19, the curved walls of the opening engaging the groove 16 to hold the fastener from displacement, and the upper faces of said walls being beveled, as indicated at 24, to permit the neck sections 19 to have freedom of motion within the opening 10 in the pivotal movements of the lock members. The described construction of this sectional retainer plate adapts the lock bolt to be applied and removed in a ready and convenient manner, while the construction of the bolt and its receiving openings is such as to permit the bolt to have rotary movement in the openings for convenience in disposing it for adjustment or to adapt it to turn with the member 1 or to permit said member 1 to freely turn therein at all times when the head sections 14 are contracted to a certain degree and except when the parts are firmly locked or bound together by the wedging engagement of the beveled or conical surfaces of the head with the walls of the enlargement 4.

In the use of the device, it will be readily understood that by pressing the levers 12 inwardly the head 14 may be contracted to such a degree as to permit it to pass through the opening in the lock plate 7, allowing the member 1 to be applied to or removed from the member 2. When the member 1 is properly placed in position upon the member 2 release of the levers 12 will result in the jaws 14 being expanded and held expanded by the action of the spring 20, thus causing the jaws to overlie the plate 7 and bear frictionally against the walls 4, whereby the member 1 is held firmly coupled to the member 2 and at the same time prevented from turning or rotating thereon. By slightly contracting the jaws 14 the pressure of the jaws may be relaxed to a sufficient degree to permit the member 1 to be turned or rotated on the member 2, independently or with the lock bolt 4, so that the member 1 may be swung around to different desired positions, an obvious advantage in the use of the device for attaching cameras or other objects to a tripod or other support. Whenever it is desired to release the member 1 from the member 2, such release may be instantaneously effected by simply pressing the handles 12 inwardly to the fullest extent and contracting the head 14 to the fullest degree, in which operation the contracted head will pass through the opening in the lock plate 7. By detaching the sections of the keeper plate 21, the lock bolt may be removed from the member 1 for cleaning, repairs or other purposes in a ready and convenient manner.

As disclosed in the construction described, the split locking bolt is split on a spiral line, whereby the opposed sets of lever arms and jaws are properly disposed for pivotal movements with respect to each other on the pivot 15, and whereby a construction is provided which permits the sections of the lock bolt to be conveniently cast, but any other equivalent construction may be employed.

From the foregoing description, taken in connection with the drawings, it will be seen that my invention provides a simple, quick and convenient type of fastener for securing a camera or other article to a tripod or other base support in such a manner as to admit of its quick application and removal, its pivotal or swinging adjustment as occasion may require, and its firm retention in position when locked. While the device is primarily designed for fastening cameras to a tripod, it is to be understood that it may be applied to many and other similar or various uses.

Having thus fully described my invention, I claim:—

1. The combination of a support, a member adapted to be secured thereto, an apertured lock plate on said member, a lock bolt comprising a pair of pivotally connected locking arms having jaws forming an expansible and contractible locking head, and manually operable spring-spread lever arms connected with the locking arms for swinging the same on their pivotal connection so as to expand and contract the head and move the jaws into and out of engagement with the lock plate, said jaws being annularly grooved, and a sectional retaining plate on the support for engagement with the grooves of the jaws, whereby the bolt locking arms are pivotally mounted on the support.

2. The combination of a support having an opening extending therethrough from side to side thereof, a member adapted to be secured thereto, an apertured lock plate on said member, and a lock bolt comprising a pair of pivotally connected locking arms provided with jaws forming an expansible and contractible locking head extending through said opening in the support and pivotally and rotatably engaging said support, said jaws being arranged to extend beyond one side of the support for engagement with and disengagement from said apertured lock plate, and spring-pressed operating arms connected with the locking arms on the opposite side of said support from said jaws, whereby the same may be operated, said operating arms being normally held spread to hold the jaws spread and in locking engagement with the lock plate.

3. The combination of a support, a member adapted to be secured thereto, an apertured lock plate on said member, an apertured retaining plate on the support, and a locking bolt having a locking head projecting through said support from side to side thereof and annularly grooved to pivotally and rotatably engage said retaining plate, said head comprising a pair of pivotally connected locking arms provided with jaws projecting beyond one side of the support for opening and closing movements and engagement with and disengagement from the lock plate, and spring-spread operating arms connected with the locking arms at the side of the support opposite said locking jaws, whereby said jaws may be retracted, said operating arms being normally maintained in position to hold the jaws projected.

In testimony whereof I affix my signature.

BERNARD L. DICKINSON.